US008554228B2

(12) United States Patent
Bontu et al.

(10) Patent No.: US 8,554,228 B2
(45) Date of Patent: Oct. 8, 2013

(54) COMPUTING AN ACTION TIME FOR ALLOCATION OF RESOURCES TO A MOBILE STATION THAT IS HANDING OVER FROM A SOURCE TO A TARGET BASE STATION

(75) Inventors: Chandra S. Bontu, Nepean (CA); Prabaharan Kanesalingam, Kanata (CA); William Edward Illidge, Kanata (CA); Devaki Chandramouli, Plano, TX (US); Stephen P. Leung, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 1265 days.

(21) Appl. No.: 12/275,621

(22) Filed: Nov. 21, 2008

(65) Prior Publication Data

US 2009/0131056 A1    May 21, 2009

Related U.S. Application Data

(60) Provisional application No. 60/989,541, filed on Nov. 21, 2007, provisional application No. 61/029,102, filed on Feb. 15, 2008.

(51) Int. Cl.
*H04W 36/00*    (2009.01)

(52) U.S. Cl.
USPC ........ 455/438; 455/440; 455/450; 455/452.1; 455/453

(58) Field of Classification Search
USPC .............................. 455/436–441, 67.11, 226.1
See application file for complete search history.

(56) References Cited

U.S. PATENT DOCUMENTS

| 7,613,148 | B2 * | 11/2009 | Hong et al. ................. 370/331 |
| 2005/0192011 | A1 | 9/2005 | Hong et al. |
| 2005/0197126 | A1 | 9/2005 | Kang et al. |
| 2005/0282548 | A1 | 12/2005 | Kim et al. |

FOREIGN PATENT DOCUMENTS

| JP | 2005-193786 | 5/2006 |
| WO | 2005/109693 | 11/2005 |

OTHER PUBLICATIONS

IEEE Computer Society and IEEE Microwave Theory and Techniques Society, Part 16: Air Interface for Fixed and Mobile Broadband Wireless Access Systems—Amendment 2: Physical and Medium Access Control Layers for Combined Fixed and Mobile Operation in Licensed Bands—Feb. 28, 2006 (864 pages).
WiMAX Forum Network Architecture, Stage 3: Detailed Protocols and Procedures, NWG Maintenance Implementation Review Draft, Release 1, Version 1.3.0, Sep. 21, 2008 (696 pages).
WiMAX Forum Network Architecture, Stage 3: Detailed Protocols and Procedures, Annex: WiMAX—3GPP2 Interworking, NWG Maintenance Implementation Review Draft, Sep. 21, 2008 (16 pages).

(Continued)

*Primary Examiner* — Temica M Beamer
(74) *Attorney, Agent, or Firm* — Finnegan, Henderson, Farabow, Garrett & Dunner LLP (57) ABSTRACT

To perform a handover of a mobile station from a source base station to a target base station, the source base station determines a delay of a connection between the source base station and the target base station. The source base station computes an action time taking into account the determined delay, the action time specifying a time when the target base station is able to allocate resources to the mobile station for the handover.

20 Claims, 3 Drawing Sheets

(56) References Cited

OTHER PUBLICATIONS

WiMAX Forum Network Architecture, Stage 3: Detailed Protocols and Procedures, Annex: WiMAX—3GPP Interworking, NWG Maintenance Implementation Review Draft, Sep. 21, 2008 (10 pages).

WiMAX Forum Network Architecture, Stage 3: Detailed Protocols and Procedures, Annex: Prepaid Accounting, NWG Maintenance Implementation Review Draft, Sep. 21, 2008 (43 pages).

WiMAX Forum Network Architecture, Stage 3: Detailed Protocols and Procedures, Annex: R6/R8 ASN Anchored Mobility Scenarios, NWG Maintenance Implementation Review Draft, Sep. 21, 2008 (15 pages).

P802.16/2004/Cor2/D3 (Draft Corrigendum to IEEE Std 802.16-2004), Part 16: Air Interface for Fixed and Mobile Broadband Wireless Access Systems, Corrigendum 2, Mar. 28, 2007 (518 pages).

Korean Patent Office, International Search Report and Written Opinion issued in corresponding PCT Application No. PCT/US2008/084257, 10 pgs., Apr. 30, 2009.

* cited by examiner

COMPUTING AN ACTION TIME FOR ALLOCATION OF RESOURCES TO A MOBILE STATION THAT IS HANDING OVER FROM A SOURCE TO A TARGET BASE STATION

CROSS-REFERENCE TO RELATED APPLICATIONS

This claims the benefit under 35 U.S.C. §119(e) of U.S. Provisional Application Ser. No. 60/989,541, entitled "WiMAX Handover," filed Nov. 21, 2007, and U.S. Provisional Application Ser. No. 61/029,102, entitled "Optimizing WiMAX Handover Delay Using GPS Absolute Time for Fast Ranging Resource Allocation," filed Feb. 15, 2008, both of which are hereby incorporated by reference.

TECHNICAL FIELD

The invention relates generally to computing an action time to specify allocation, in advance, of radio resources at a target base station to a mobile station that is being handed over from a source base station to a target base station.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

Another type of wireless access technology is the WiMax (Worldwide Interoperability for Microwave Access) technology. WiMax is based on the IEEE (Institute of Electrical and Electronics Engineers) 802.16 Standard. The WiMax wireless access technology is designed to provide wireless broadband access.

In a wireless access network, a mobile station can be handed over from a source base station to a target base station as the mobile station moves between different coverage areas. Traditionally, in a WiMax wireless access network, the mobile station performs a ranging procedure during initial network entry or network re-entry or during handover, in which a randomly selected ranging code is sent by the mobile station to a serving or target base station to allow for the mobile station to acquire time synchronization with the base station. After successful reception of the ranging code, the base station allocates required resources to the mobile station to allow the mobile station to send a ranging request message to identify the mobile station's service authorization. Typically, the ranging procedures performed by multiple mobile stations are contention-based such that there is a possibility of collisions of the ranging codes sent by the multiple mobile stations. Collisions can lead to delays in the handover procedure.

To reduce latency during a handover from the source base station to the target base station, a fast-ranging handover technique is provided by WiMax. Fast-ranging handover is initiated when the target base station sends a fast-ranging information element to the mobile station. The fast-ranging information element contains the necessary resource allocation for the mobile station to transmit the ranging request message without the need of sending a ranging code. The fast-ranging handover procedure avoids contention-based ranging during the handover procedure, which reduces latency and improves handover performance. To support fast-ranging handover, WiMax defines the concept of an action time, which is the earliest time (expressed in terms of frames) from a predefined message (sent to the mobile station) at which the target base station can allocate uplink resources to the mobile station. At the action time, the target base station is able to send a message to allocate uplink resources to the mobile station, where the message includes the fast-ranging information element. The fast-ranging information element includes information identifying a dedicated transmission opportunity to the mobile station to send a ranging request message, for non-contention based ranging.

Conventionally, action time is initially determined by the target base station, based on the load at the target base station. Basically, the action time that is specified by the target base station indicates that the target base station can accommodate the incoming mobile station after a certain number of frames in view of the current loading at the target base station. This initial action time is sent to a source base station (which is the base station currently serving the mobile station). The source base station may change the initial action time provided by the target base station, and this changed action time (which is greater than or equal to the original action time set by the target base station) can be provided by the source base station to both the target base station and the mobile station. However, conventionally, the changed action time that is communicated to the target base station may not result in optimized handover performance, and in fact, can lead to increased latency in the handover.

SUMMARY

In general, according to an embodiment, a method of performing a handover of a mobile station from a source base station to a target base station includes determining, at the source base station, a delay of a connection between the source base station and the target base station. The source base station computes an action time taking into account the determined delay, where the action time specifies a time when the target base station is able to allocate resources to the mobile station for the handover.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
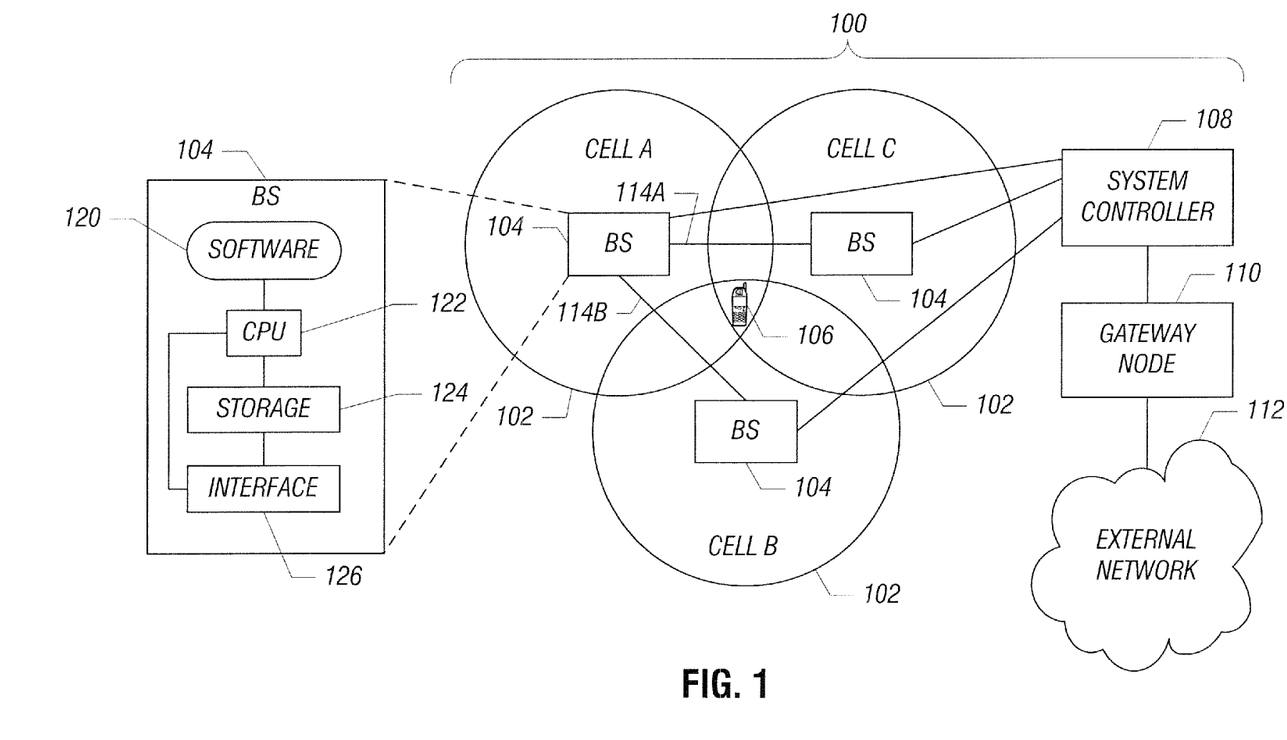
FIG. 1 is a block diagram of an exemplary communications network in which an embodiment of the invention can be incorporated.

FIG. 1 illustrates a communications network that includes a wireless access network 100 having a number of cells 102 (cells A, B, and C depicted). Each cell 102 is associated with a corresponding base station 104, where the base station 104 is able to communicate with mobile stations (mobile station 106 depicted in FIG. 1) within corresponding coverage areas of the base stations 104. The base station 104 can include a base transceiver station (BTS) to perform radio frequency (RF) communications with mobile stations in the coverage area of the base station. Also, the base station can include a base station controller or radio network controller for controlling tasks associated with the base station.

As further depicted in FIG. 1, the base stations 104 are connected to a system controller 108. If the wireless access network 100 is a WiMax (Worldwide Interoperability for Microwave Access) access network, as defined by the IEEE (Institute of Electrical and Electronics Engineers) 802.16 standards, then the system controller 108 can be an access service network (ASN) gateway. The system controller 108 is in turn connected to a gateway node 110, which connects the wireless access network 100 to an external network 112, such as the Internet. In the WiMax context, the gateway node 110 is referred to as a connectivity service network (CSN) node.

In the ensuing discussion, reference is made to WiMax access networks. However, in other implementations, techniques according to some embodiments can be applied to other types of wireless access networks, including the following: GSM (Global System for Mobile communications) or UMTS (Universal Mobile Telecommunications System) networks, defined by the Third Generation Partnership Project (3GPP); CDMA 2000 (Code Division Multiple Access 2000) network, defined by 3GPP2; Long Term Evolution (LTE) network from 3GPP, which is an enhancement of the UMTS technology; or other access networks.

As further shown in FIG. 1, each base station 104 can include software 120 executable on one or more central processing units (CPUs) 122 to perform tasks of the base station 104. The CPU(s) 122 is (are) coupled to a storage 124 and to one or more interfaces 126 to communicate with various entities, including mobile stations, other base stations, and the system controller 108.

As depicted in FIG. 1, the mobile station 106 is in a region of overlap of cells A, B, and C. As a result, the mobile station 106 is a candidate for being handed over from a source base station (e.g., base station 104 in cell A) to one of the two target base stations (e.g., base stations in cells B and C). For decreased latency in performing a hard handover from a source base station to a target base station, a fast-ranging handover radio resources required at the target base station to allow the mobile station to send a ranging request) during the handover procedure.

The fast-ranging procedure is enabled by the target base station sending a fast-ranging information element to the mobile station that is being handed over. The fasting-ranging information element is described in the IEEE 802.16 standards. The fast-ranging information element is sent as part of a message for allocating uplink resources to the mobile station (to enable the mobile station to have access to the uplink channel from the mobile station to the target base station). In some embodiments, the message for allocating uplink resources is an uplink map (UL-MAP) message. The fast-ranging information element specifies a time (in number of frames) when a dedicated transmission opportunity is provided to the mobile station to send a ranging request message.

WiMax defines the concept of an action time (expressed in number of frames) at which the target base station is expected to send the fast-ranging information element (included in the UL-MAP message) to the mobile station. More generally, the action time is the earliest time (expressed in terms of frames) from a predefined message (sent to the mobile station) at which the target base station can allocate uplink resources to the mobile station. Stated differently, the action time informs the mobile station when the mobile station can expect the uplink allocation by the target base station.

Conventionally, the action time is initially computed by the target base station and communicated to the source base station for relaying to the mobile station (the communication between the target and the serving base stations occurs over the backhaul network, either through an R8 link or through the ASN gateway). The initial action time received from the target base station by the source base station can be modified by the source base station. In some implementations, the modification by the source base station takes into account the expected processing delay at the mobile station for the mobile station to be ready for the handover. This delay includes the time required for the mobile station to process an MOB_B-SHO-RSP message (discussed further below) from the serving base station and to acquire synchronization with the target base station, and to become ready to receive the UL-MAP from the target base station. Note that the delay information associated with the above mobile station capabilities is provided to the serving base station during initial registration of the mobile station with the serving base station. In one example, if the expected processing delay at the mobile station is greater than the initial action time value, then the source base station will change the action time to be equal to the expected processing delay at the mobile station. As another example, in a scenario where there are multiple potential target base stations to which the mobile station can be handed over, the source base station can select the maximum of the initial actions times computed by the multiple potential target base stations to use as the modified action time that is sent back to the target base stations.

However, conventionally, the modified action time calculated by the source base station and sent to the mobile station and the target base station(s) does not take into account the communication delay associated with a backhaul connection between the source base station and each target base station. In FIG. 1, a backhaul connection 114A is connected between the base stations in cells A and C, while another backhaul connection 114B is connected between base stations in cells A and B. The communication delay over a backhaul connection is referred to as a "backhaul propagation delay." The backhaul propagation delay on each backhaul connection is not necessarily a fixed value, but rather can be variable, such as due to variations in loading and equipment performance.

If the backhaul propagation delay is not considered, then, under certain conditions, a target base station may unnecessarily delay sending the fast-ranging information element to the mobile station, which can add to the overall handover delay.

In accordance with some embodiments, to improve the accuracy of the action times that are sent by the source base station to a target base station and to the mobile station that is being handed over from the source base station to the target base station, the backhaul propagation delay associated with a backhaul connection between the source base station and the target base station is determined, and the action times computed by the source base station for communication to the target base station and mobile station take into account the determined backhaul propagation delay. The action times that take into account the backhaul propagation delay allow for a reduction of delays associated with handover procedures.

The backhaul propagation delay can be measured in one of various ways, which are described below in connection with message flows depicting handover procedures in FIGS. 2 and 3.

Figure 2:
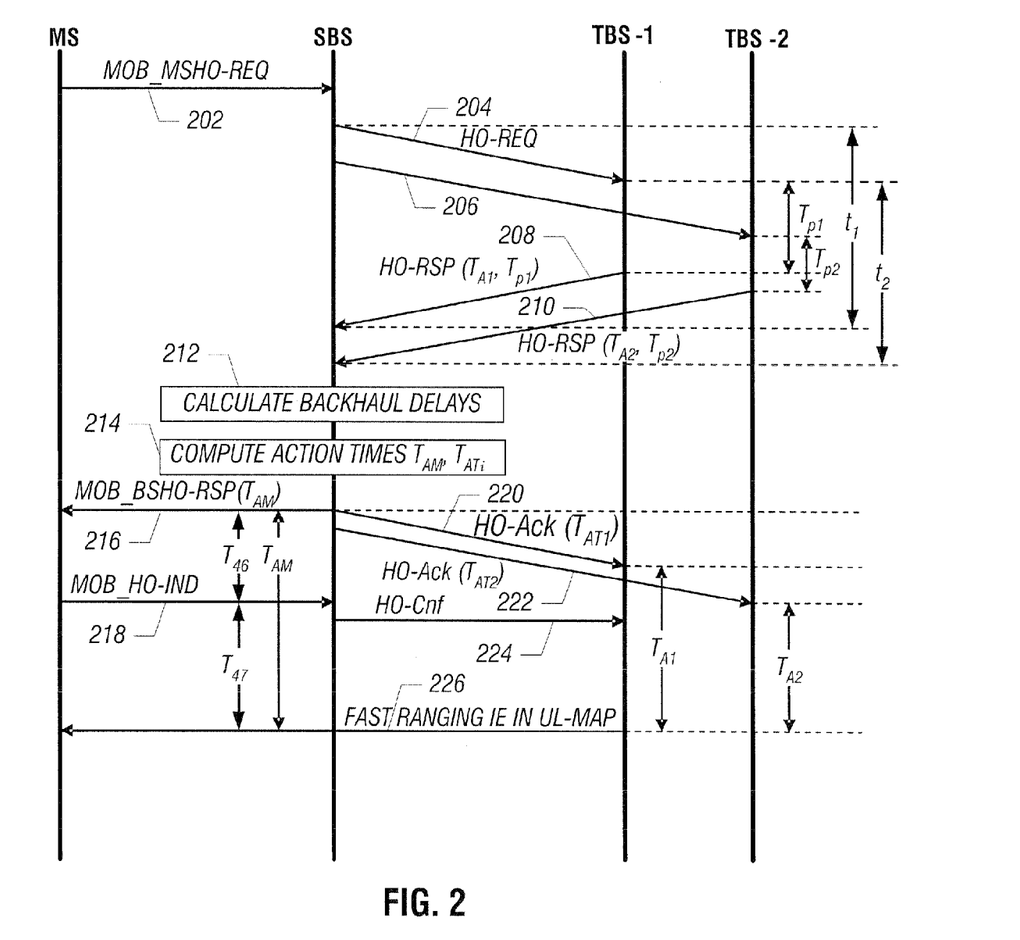
FIGS. 2-3 illustrate handover procedures according to some embodiments.

FIG. 2 shows an exemplary flow diagram of a handover procedure involving a source base station (SBS) and one of two possible target base stations (TBS-1 and TBS-2). The handover procedure depicted in FIG. 2 uses WiMax messaging, as specified in IEEE 802.16e and the WiMax Forum Network Architecture specifications. The mobile station sends a mobile station handover request (at 202) to initiate a handover procedure. In the example of FIG. 2, the mobile station handover request is in the form of an MOB_MSHO-REQ message, as defined by IEEE 802.16. The mobile station sends the mobile station handover request to initiate a handover from the source base station to a target base station (one of TBS-1 and TBS-2 in the example of FIG. 2). In response to the mobile station handover request, the source base station (SBS) sends a handover request message (HO-REQ) to each of the potential target base stations TBS-1 and TBS-2 (at 204, 206). Upon sending of each respective HO-REQ message, the source base station SBS starts a corresponding timer $C_i$, where i=1 to n (n≥1 to represent the number of potential target base stations). In the example of FIG. 2, upon sending the HO-REQ message at 204, the source base station SBS starts timer $C_1$, and upon sending the HO-REQ message at 206, the source base station SBS starts timer $C_2$.

In FIG. 2, the time parameter $T_{p1}$ represents the processing time involved in target base station TBS-1 for processing the handover request received at 204, and the time parameter $T_{p2}$ represents the processing time in the second target base station TBS-2 to process the handover request received at 206.

Upon receipt of the handover request (at 204), and after time $T_{p1}$, the first target base station TBS-1 responds (at 208) with a handover response message (HO-RSP), where the HO-RSP message contains two time parameters: $T_{A1}$ (which represents the initial action time calculated by target base station TBS-1), and the processing time $T_{p1}$. Effectively, $T_{p1}$ represents the time between receipt of the HO-REQ message and transmission of the HO-RSP message.

Similarly, after receiving the handover request (at 206), the second target base station TBS-2 after time $T_{p2}$ sends (at 210) a handover response message (HO-RSP), which contains time parameters $T_{A2}$ (initial action time calculated by target base station TBS-2), and $T_{p2}$.

Upon receipt of the HO-RSP message from the $i^{th}$ target base station, the source base station stops a timer, $C_i=t_i$, that corresponds to the $i^{th}$ target base station. The value $t_i$ represents the time elapsed between when the source base station sent the HO-REQ message to the $i^{th}$ target base station, and receipt of the corresponding HO-RSP message. The times $t_1$ and $t_2$ corresponding to timer counts relating to the target base stations TBS-1 and TBS-2, respectively, as depicted in FIG. 2.

From the processing delay times $T_{p1}$ and $T_{p2}$ and the corresponding elapsed times $t_1$ and $t_2$ between the HO-REQ and HO-RSP messages, the backhaul propagation delays $T_{di}$ can be calculated (at 212) as follows:

$$T_{di} = \frac{t_i - T_{pi}}{2}, \quad \text{(Eq. 1)}$$

Eq. 1 above basically takes the difference between the total elapsed time (time between sending of HO-REQ and receipt of HO-RSP at the source base station SBS) and the processing time in the respective target base station, divided by 2, to represent the backhaul propagation delay in one direction Note that HO-REQ traverses the backhaul connection in one direction, while HO-RSP traverses the backhaul connection in the reverse direction. Using Eq. 1, $T_{d1}$ represents the backhaul propagation delay between the source base station and the first target base station TBS-1, while $T_{d2}$ represents the backhaul propagation delay between the source base station and the second target base station TBS-2.

Based on the calculated backhaul propagation delays, various action times are computed (at 214) by the source base station SBS. The computed action times include $T_{AM}$ (discussed more fully below), which is communicated to the mobile station, and $T_{ATi}$ (also discussed more fully below), for i=1 to n, where n represents the number of potential target base stations. In the example of FIG. 2, the computed action times include $T_{AM}$, $T_{AT1}$, and $T_{AT2}$. The action times $T_{AT1}$ and $T_{AT2}$ are communicated to respective first and second target base stations TBS-1 and TBS-2. In general, these computed times ($T_{AT1}$, and $T_{AT2}$) can be different from the ones ($T_{A1}$, and $T_{A2}$) received from the respective target base stations.

In FIG. 2, the action time $T_{AM}$ is sent (at 216) from the source base station SBS to the mobile station in a handover response message MOB_BSHO-RSP, which is responsive to the MOB_MSHO-REQ message sent at 202 from the mobile station to the source base station SBS. Note that the MOB_B-SHO-RSP message also contains information identifying one or more potential target base stations selected by the source base station for mobile station handover. The MOB_BSHO-RSP message can include a list of potential target base stations ordered such that the first potential target base station in the list is the most preferred. The list of potential target base stations is presented to the mobile station for selection of one of the potential target base stations.

The source base station also sends handover acknowledgment messages (at 220, 222) to respective target base stations TBS-1 and TBS-2. The handover acknowledgment messages in one example are HO-Ack messages, and each of the HO-Ack messages contains a respective action time $T_{AT1}$ and $T_{AT2}$ computed by the source base station. As depicted in FIG. 2, the first target base station TBS-1 waits the action time $T_{AT1}$ before it can send a fast-ranging information element, and the second target base station TBS-2 waits the action time $T_{AT2}$ before it can send a fast-ranging information element.

The action times computed by the source base station at 214 are computed according to the following equations:

$$T_{AM} = f_M(T_{Ai}, T_{di}, T_{46} + T_{47}), \quad \text{(Eq. 2)}$$

$$T_{ATi} = f_T(T_{Ai}, T_{di}, T_{46} + T_{47}), \quad \text{(Eq. 3)}$$

where the functions $f_M(\ldots)$ and $f_T(\ldots)$ are defined as follows:

$$T_{AM} = f_M(\alpha, \beta, \gamma) = (\alpha \leq \gamma - \beta)?\gamma:\text{Max}(\{\alpha+\beta\}_{i=1,\ldots N}), \quad \text{(Eq. 4)}$$

$$T_{ATi} = f_T(\alpha, \beta, \gamma) = (\alpha \leq \gamma - \beta)?\gamma - T_{di}:\text{Max}(\{\alpha\}_{i=1,\ldots N}),$$
respectively, (Eq. 5)

According to each of Eqs. 4 and 5, $\alpha = T_{Ai}$, $\beta = T_{di}$, and $\gamma = T_{46} + T_{47}$. The parameter $T_{46}$ represents a handover indication readiness time that indicates the processing time required at the mobile station to respond to the MOB_BSHO-RSP message (received at 216 by the mobile station) by sending an MOB_HO-IND message (sent at 218) from the mobile station to the source base station. The MOB_HO-ND message sent at 218 is used by the mobile station to indicate to the source base station which of the target base stations the mobile station has selected for handover. The MOB_HO-ND message also provides other information.

The parameter $T_{47}$ is a base station switching time which represents the minimum time that the mobile station requires between transmission of the MOB_HO-IND message until it is able to receive a message for allocating uplink resources from a target base station (sent at 226), where the message for allocating uplink resources includes the fast-ranging information element. $T_{47}$ is depicted in FIG. 2 between the MOB_HO-IND message and the message received at 226. Together $T_{46}$ and $T_{47}$ represent the processing time at the mobile station that is required to perform a handover upon receipt of the MOB_BSHO-RSP message, which is a message containing potential target base stations that are selectable by the mobile station for handover.

Eq. 4 specifies that if $\alpha \leq \gamma - \beta$ is true, then $T_{AM}$ is set equal to $\gamma$. However, if $\alpha \leq \gamma - \beta$ is not true, then $T_{AM}$ is set equal to the maximum of $\{\alpha + \beta\}_i$ for corresponding target base stations. What this effectively means is that if the sum of the action time $T_{Ai}$ (as received from the target base station TBS-i) and the backhaul propagation delay time $T_{di}$ (backhaul propagation delay between the source base station SBS and target base station TBS-i) is less than or equal to the processing time at the mobile station (sum of $T_{46}+T_{47}$), then the processing time at the mobile station ($T_{46}+T_{47}$) is used as $T_{AM}$ that is communicated to the mobile station. On the other hand, if the sum of $T_{Ai}$ (as provided by the target base station) and the backhaul propagation delay $T_{di}$ is not less than the processing time $T_{46}+T_{47}$, then the value of $T_{AM}$ is set equal to the maximum of the $\{T_{Ai}+T_{di}\}$ values from all potential target base stations. In this latter case, the $T_{AM}$ value sent to the mobile station adds the backhaul propagation delay to the action time $T_{Ai}$ initially calculated by the target base station TBS-i to more accurately indicate to the mobile station when the fast-ranging information element is expected.

Eq. 4 thus specifies that $T_{AM}$ is set to the larger of the handover processing time required at the mobile station ($T_{46}+T_{47}$) and the maximum of the target base station computed action times plus respective backhaul propagation delays.

To adjust the value of $T_{ATi}$, which is sent to target base stations, Eq. 5 specifies that if $\alpha \leq \gamma - \beta$ is true, then $T_{ATi}$ is set equal to $\gamma - T_{di}$. However, if $\alpha \leq \gamma - \beta$ is not true, then $T_{ATi}$ is set equal to the maximum of $\{\alpha\}_i$ for corresponding target base stations. What this effectively means is that if the sum of the initial action time $T_{Ai}$ (as received from the target base station TBS-i) and the backhaul propagation delay time $T_{di}$ (backhaul propagation delay between the source base station SBS and target base station TBS-i) is less than or equal to the processing time at the mobile station (sum of $T_{46}+T_{47}$), then the processing time at the mobile station ($T_{46}+T_{47}$), less the backhaul propagation delay $T_{di}$, is used as $T_{ATi}$ that is communicated to the target base station TBS-i. In this case, the backhaul propagation delay $T_{di}$ is deducted from $T_{46}+T_{47}$ so that the target base station is able to send the fast-ranging information element at a time that is equal to $T_{46}+T_{47}$ minus $T_{di}$ such that the mobile station receives the fast-ranging information element at $T_{46}+T_{47}$. This avoids adding unnecessary delay in the transmission of the fast-ranging information element at the target base station.

On the other hand, if the sum of the initial $T_{Ai}$ (as provided by the target base station) and the backhaul propagation delay $T_{di}$ is not less than the processing time $T_{46}+T_{47}$, then the value of $T_{ATi}$ is set equal to the maximum of the $\{T_{Ai}\}$ values from all potential target base stations.

As shown in FIG. 2, it is assumed that the first target base station TBS-1 is the target base station selected by the mobile station, and indicated in the MOB_HO-IND message sent (at 218) by the mobile station to the source base station. In response to receipt of the MOB_HO-IND message, the source base station sends (at 224) a handover confirmation message (HO-Cnf) to the selected target base station, which in this example is TBS-1.

In response to the HO-Cnf message, the target base station TBS-1 sends (at 226) the fast-ranging information element to the mobile station. As noted above, the fast-ranging information element is part of an uplink map message (UL-MAP), which provides the uplink access definition. The message (226) is sent at a time that is $T_{AT1}$ after the target base station TBS-1 receives HO-Ack (at 220).

As noted above, the fast-ranging information element identifies an opportunity (e.g., time interval) in which the mobile station is able to send a ranging request to perform non-contention based ranging. In response to this ranging request from the mobile station, the target base station sends a ranging response to allow the mobile station to determine the round-trip delay between the mobile station and the target base station.

It is noted that the action times $T_{AM}$ and $T_{ATi}$ are relative action times that are measured from some event. For example, $T_{AM}$ is measured from the MOB_BSHO-RSP message (216), and $T_{AT1}$ and $T_{AT2}$ are measured from receipt of HO-Ack (220) and HO-Ack (222), respectively. The action times $T_{AM}$ and $T_{ATi}$ can be expressed in terms of clock time or number of frames, where a "frame" refers to a data structure for carrying control and/or data over a wireless link and has a predetermined time length.

Figure 3:
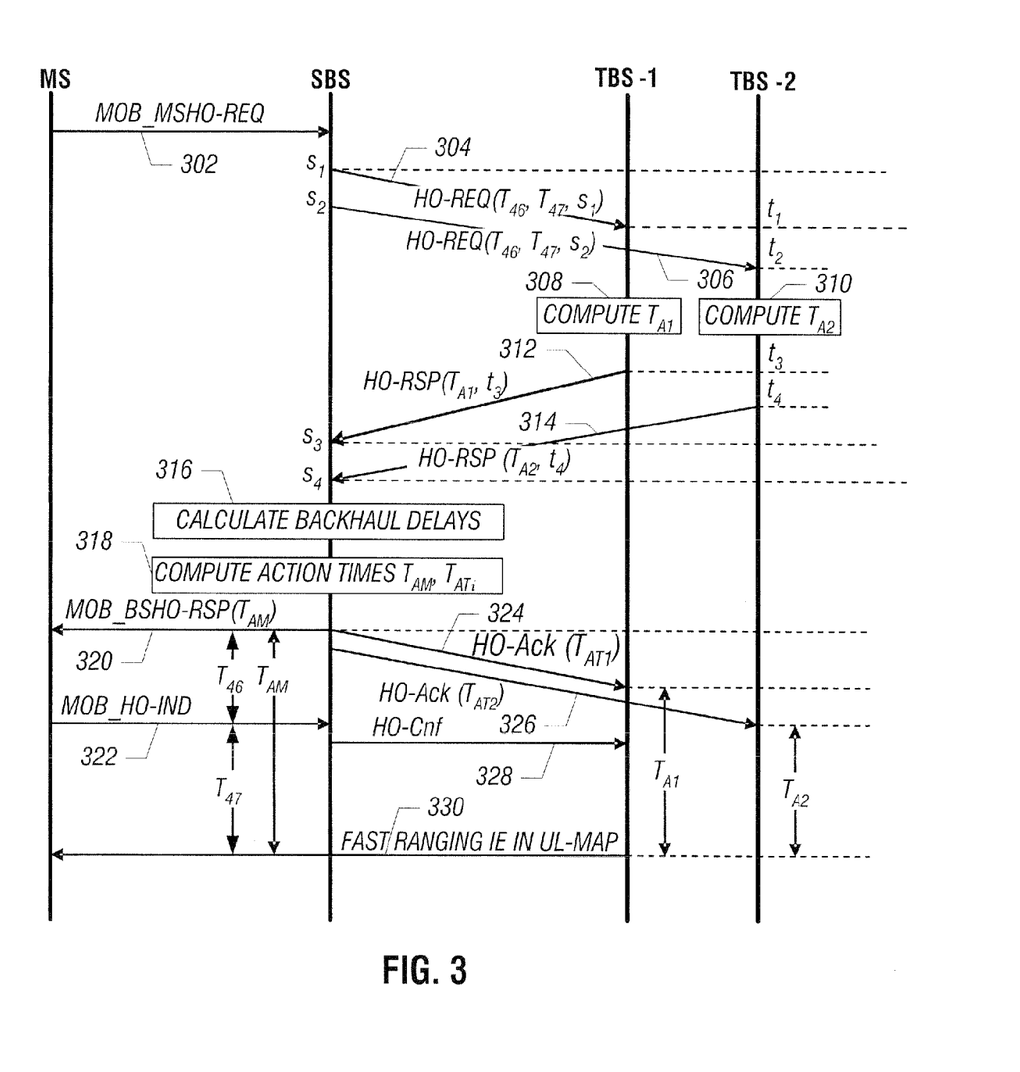

FIG. 3 is a flow diagram of another embodiment of the invention. Note that in the FIG. 2 procedure, the values of $T_{46}$ and $T_{47}$ (handover processing times associated with the mobile station) are not provided to the target base stations. However, with the embodiment of FIG. 3, $T_{46}$ and $T_{47}$ are communicated to the target base stations.

The mobile station initiates handover by sending (at 302) an MOB_MSHO-REQ message to the source base station. In response to the handover request from the mobile station, at time $s_1$, the source base station sends (at 304) a handover request message, HO-REQ, to the first target base station TBS-1. The HO-REQ message contains the parameters $T_{46}$ and $T_{47}$, as well as the timestamp $s_1$.

Similarly, at time $s_2$, the source base station sends (at 306) an HO-REQ message to the second target base station TBS-2, where this HO-REQ message also contains $T_{46}$ and $T_{47}$, as well as the timestamp $s_2$.

At the first target base station TBS-1, the HO-REQ message transmitted at 304 is received at time $t_1$, and at the second target base station TBS-2, the HO-REQ message transmitted at 306 is received at time $t_2$.

Each of the target base stations TBS-1 and TBS-2 computes (at 308, 310, respectively) a respective action time $T_{A1}$ and $T_{A2}$, where each action time $T_{Ai}$ is calculated according to timestamps $t_i$ and $s_i$ (i=1 or 2 in the example of FIG. 3), and according to $T_{46}+T_{47}$. Specifically, $T_{Ai}$ is computed at each target base station i as follows:

$$T_{Ai}=f_G(T_i,t_i-s_i,T_{46}+T_{47}), \qquad \text{(Eq. 6)}$$

where $T_i$ represents the action time normally computed at the respective target base station, and the function $f_G$ is expressed as follows:

$$T_{Ai}=f_G(\alpha,\beta,\gamma)=(\alpha\leq\gamma-\beta)?\gamma{-}(t_i-s_i){:}(\{\alpha\}_{i=1,\ldots N}), \qquad \text{(Eq. 7)}$$

According to Eqs. 6 and 7, the value of $T_{Ai}$ is equal to the action time normally computed at the target base station if $T_i$ is not less than or equal to $(T_{46}+T_{47})$ $(t_i-s_i)$. Note that $t_i-s_i$ represents the backhaul propagation delay between the source base station and target base station TBS-i. On the other hand, if $T_i$ is less than or equal to $(T_{46}+T_{47})-(t_i-s_i)$, then the value of $T_{Ai}$ is set equal to $(T_{46}+T_{47})-(t_i-s_i)$, which means that the action time is set equal to the expected handover processing delay time at the mobile station less the backhaul propagation delay.

In response to the HO-REQ message (at 304), the first target base station TBS-1 sends (at 312) a handover response message, HO-RSP, that contains the computed $T_{A1}$ parameter and a timestamp $t_3$ that represents the time at which the target base station TBS-1 sent the HO-RSP message. Similarly, the second target base station TBS-2 sends (at 314) a handover response message HO-RSP to the source base station, where the HO-RSP message sent at 314 contains $T_{A2}$ computed at 310 and a timestamp $t_4$ corresponding to the time at which the HO-RSP message was sent.

At the source base station, the backhaul propagation delays are calculated (at 316). The backhaul propagation delay $(T_{d1})$ of the backhaul connection between the source station and the target base station TBS-1 is computed as $s_3-t_3$, where $s_3$ is the time at which the HO-RSP message (312) was received at the source base station SBS. Similarly, the backhaul propagation delay $(T_{d2})$ of the backhaul connection between the source base station and the target base station TBS-2 is represented as $s_4-t_4$, where $s_4$ is the time at which HO-RSP (314) was received at the source base station.

Based on the calculated backhaul propagation delays computed at the source base station, the action times $T_{AM}$ and $T_{Ai}$, i=1 to n, where n represents the number of potential target base stations, are computed at (318) as follows:

$$T_{AM}=f_M(T_{Ai}-T_{46}-T_{47},T_{di},T_{46}+T_{47}), \quad \text{(Eq. 8)}$$

$$T_{ATi}=f_T(T_{Ai}-T_{46}-T_{47},T_{di},T_{46}+T_{47}), \quad \text{(Eq. 9)}$$

where the function $f_M(\ldots)$ is defined by Eq. 10 below, and $f_T(\ldots)$ is defined by Eq. 11 below:

$$T_{AM}=f_M(\alpha,\beta,\gamma)=(\alpha\leq\gamma-\beta)?\gamma:\text{Max}(\{\alpha+\beta\}_{i=1,\ldots,N}), \quad \text{(Eq. 10)}$$

$$T_{ATi}=f_T(\alpha,\beta,\gamma)=(\alpha\leq\gamma-\beta)?\gamma-T_{di}:\text{Max}(\{\alpha\}_{i=1,\ldots,N}). \quad \text{(Eq. 11)}$$

The difference between Eqs. 8 and 9 of the FIG. 3 procedure and Eqs. 2 and 3 of the FIG. 2 procedure is that Eqs. 8 and 9 take into account the fact that the action times $T_{Ai}$ computed by the target base stations are based on $T_{46}$ and $T_{47}$.

According to Eqs. 8 and 10, the value of $T_{AM}$ is set equal to $T_{46}+T_{47}$ if $T_{Ai}$ is less than or equal to $(T_{46}+T_{47})-T_{di}$, which means that the action time is set equal to the handover processing delay time at the mobile station less the backhaul propagation delay. On the other hand, if $T_{Ai}$ is not less than or equal to $(T_{46}+T_{47})-T_{di}$, then the value of $T_{AM}$ is set equal to the maximum of the $\{(T_{Ai}-T_{46}-T_{47})+T_{di}\}$ values associated with the n target base stations.

According to Eqs. 9 and 11, the value of $T_{ATi}$ is set equal to $(T_{46}+T_{47})-T_{di}$ if $T_{Ai}$ is less than or equal to $(T_{46}+T_{47})-T_{di}$. On the other hand, if $T_{Ai}$ is not less than or equal to $(T_{46}+T_{47})-T_{di}$, then the value of $T_{ATi}$ is set equal to the maximum of the $\{T_{Ai}-T_{46}-T_{47})\}$ values associated with the n target base stations.

The remaining messages 320, 322, 324, 326, 328, and 330 in FIG. 3 are similar to respective messages 216, 218, 220, 222, 224, and 226 in FIG. 2.

In an alternative embodiment, instead of sending different action times $T_{AM}$ and $T_{ATi}$ as described in FIGS. 2 and 3 above to account for backhaul propagation delays, the action time can be expressed as a number of frames (where a "frame" refers to a data structure for carrying control and/or data over a wireless link and has a predetermined time length) and communicated to the mobile station. This number (X) of frames representing the action time can be sent to the mobile station in the MOB_BSHO-RSP message (or alternatively, in an MOB_BSHO-REQ message). The MOB_BSHO-RSP (or MOB_BSHO-REQ) message is sent in a particular frame from the serving base station SBS to the mobile station, and the serving base station is able to translate this particular frame number into absolute time T1.

The serving base station can then compute a second absolute time T2 that is computed as follows:

$$T2=T1+X*\text{Frame\_Size}, \quad \text{(Eq. 12)}$$

where Frame_Size is equal to the predetermined time length of a frame. The absolute time T2 is sent to the target base station in an HO-Ack message (similar to the HO-Ack message sent at 220, 222, 324, or 326 in FIG. 2 or 3). The target base station sends the fast-ranging information element in the UL-MAP message at absolute time T2.

Alternatively, instead of computing T2 at the serving base station SBS, the computation of T2 can be performed at the target base station. To enable this, the serving base station SBS sends the values of X and T1 to the target base station, which computes T2 according to Eq. 12 above.

To allow the base stations to communicate absolute times rather than relative times, each of the base stations has a global positioning system (GPS) to enable the base stations to be time synchronized with each other.

The various tasks above can be performed by software in a base station (e.g. software 120 depicted in FIG. 1). Instructions of such software are executed on a processor (e.g., CPUs 122 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing a handover of a mobile station from a source base station to a target base station, comprising:
   determining, at the source base station, a delay of a connection between the source base station and the target base station;
   computing, at the source base station, a first action time taking into account the determined delay, the first action time specifying a time when the target base station is able to allocate resources to the mobile station for the handover;

sending the first action time to the target base station for use by the target base station to allocate resources for the handover;

computing a second action time different from the first action time, the second action time also taking into account the determined delay; and sending the second action time to the mobile station to indicate to the mobile station a time at which the mobile station is expected to receive a message from the target base station regarding allocation of resources for the handover.

2. The method of claim 1, wherein the second action time accounts for the determined delay so that the mobile station is able to expect receipt of the message from the target base station at a time equal to the first action time plus the determined delay.

3. The method of claim 1, wherein the mobile station has a processing time for performing the handover, and wherein the first action time accounts for the determined delay so that the target base station is able to send the message to the mobile station at a time equal to the processing delay minus the determined delay.

4. The method of claim 1, further comprising:
receiving a third action time from the target base station, wherein the computed first action time is based on at least the third action time and the determined delay.

5. The method of claim 4, wherein the computed first action time is further based on a processing time for performing the handover at the mobile station, and wherein the computed first action time is computed by:
setting the computed first action time to the processing time less the determined delay if the third action time is less than or equal to the processing time less the delay; and
setting the computed first action time to the third action time if the third action time is not less than or equal to the processing time less the delay.

6. The method of claim 4, wherein the computed first action time is further based on a processing time for performing the handover at the mobile station, and wherein the computed first action time is computed by:
setting the computed first action time to the processing time less the delay if the third action time minus the processing time is less than or equal to the processing time minus the determined delay; and
setting the computed first action time to the first action time less the processing time if the third action time minus the processing time is not less than the processing time minus the delay.

7. The method of claim 6, wherein receiving the third action time comprises:
receiving the third action time set to the processing time less a second delay of the connection determined at the target base station if a determined action time computed at the target base station is less than or equal to the processing time less the second delay; and
receiving the third action time set to the determined action time if the determined action time is not less than or equal to the processing time less the second delay.

8. The method of claim 1, wherein plural potential target base stations are available to which the mobile station can be handed over, the method further comprising:

receiving third action times from the plural target base stations, wherein the computed first action time is based on at least the third action times and the determined delay.

9. The method of claim 1, wherein determining the delay comprises:
starting a timer upon the source base station sending a handover request to the target base station;
receiving a response to the handover request from the target base station, wherein the response contains a processing time indicating a time between receipt of the handover request and sending of the response by the target base station; and
stopping the timer upon receipt of the response, wherein the timer provides an elapsed time between sending of the handover request and receipt of the response by the source base station,
wherein the determined delay is based on the elapsed time and processing time.

10. The method of claim 1, wherein determining the delay comprises:
receiving, from the target base station, a response to a handover request sent by the source base station to the target base station, wherein the response contains a first time indicating a time at which the response was sent by the target base station; and
recording a second time that is a time at which the source base station received the response,
wherein the determined delay is based on a difference between the second time and the first time.

11. A target base station that is a target for handover of a mobile station from a source base station, comprising:
an interface to communicate with the source base station; and
a processor to:
send a first action time computed at the target base station to the source base station; and
receive a second action time modified from the first action time, wherein the second action time is based on a computed propagation delay over a connection between the target base station and source base station.

12. The target base station of claim 11, wherein the mobile station is associated with a processing time to perform the handover, and wherein the processor is to further:
receive a handover request from the source base station, the handover request containing the processing time; and
compute a second propagation delay at the target base station, and
wherein the first action time is computed by:
determining an action time based on loading of the target base station;
if the determined action time is less than or equal to the processing time less the second propagation delay, set the first action time to the processing time less the second propagation delay; and
if the determined action time is not less than or equal to the processing time less the second propagation delay, set the first action time to the determined action time.

13. The target base station of claim 11, wherein the handover request
contains a first time indicating a time at which the handover request was transmitted by the source base station, and wherein the processor is to further:
record a second time at which the handover request was received at the target base station,
wherein the second propagation delay is based on a difference between the second time and first time.

14. The target base station of claim 13, wherein the processor is to further send, to the source base station, a response to the handover request, the response containing a time indicating when the response was sent by the target base station, wherein the time contained in the response allows the source base station to compute the propagation delay at the source base station.

15. The target base station of claim 11, wherein the processor is to send a fast-ranging information element to the mobile station at a time based on the second action time, wherein the fast-ranging information element identifies an opportunity at which the mobile station is able to send a ranging request for non-contention based ranging.

16. The target base station of claim 13, wherein the fast-ranging information element is part of an uplink map (UL-MAP) message for allocation of uplink messages.

17. An article comprising at least one computer-readable storage medium containing instructions that when executed cause a source base station to:
   send a message to a mobile station, wherein the message contains a value indicating when the mobile station is to expect receipt of ranging information from a target base station indicating when the mobile station is able to send a ranging request; and
   send timing information to the target base station, wherein the timing information contains an absolute time and is used to determine when the target base station is to send the ranging information to the mobile station.

18. The article of claim 17, wherein the timing information includes one of:
   (a) the absolute time calculated by the source base station from the value; and
   (b) the value and the absolute time indicating a time at which the message containing the value was sent to the mobile station.

19. An article comprising at least one computer-readable storage medium containing instructions that when executed cause a target base station that is a target for handover of a mobile station from a source base station to:
   send a first action time computed at the target base station to the source base station; and
   receive a second action time modified from the first action time, wherein the second action time is based on a computed propagation delay over a connection between the target base station and source base station.

20. A source base station comprising:
   an interface to communicate with a target base station; and
   a processor to:
   send a message to a mobile station that is to be handed over from the source base station to the target base station, wherein the message contains a value indicating when the mobile station is to expect receipt of ranging information from a target base station indicating when the mobile station is able to send a ranging request; and
   send timing information to the target base station, wherein the timing information contains an absolute time and is used to determine when the target base station is to send the ranging information to the mobile station.

* * * * *